(12) United States Patent
Brizard

(10) Patent No.: US 9,849,953 B2
(45) Date of Patent: Dec. 26, 2017

(54) AUTONOMOUS UNDERWATER VEHICLE FOR MARINE SEISMIC SURVEYS

(71) Applicant: CGG SERVICES SA, Massy (FR)

(72) Inventor: Thierry Brizard, Massy (FR)

(73) Assignee: CGG SERVICE SAS, Massy (FR)

( * ) Notice: Subject to any disclaimer, the term of this patent is extended or adjusted under 35 U.S.C. 154(b) by 621 days.

(21) Appl. No.: 13/972,139

(22) Filed: Aug. 21, 2013

(65) Prior Publication Data

US 2014/0053768 A1 Feb. 27, 2014

Related U.S. Application Data

(60) Provisional application No. 61/692,921, filed on Aug. 24, 2012.

(51) Int. Cl.
*B63G 8/00* (2006.01)
*G01V 1/38* (2006.01)
*G01V 1/16* (2006.01)

(52) U.S. Cl.
CPC ............. *B63G 8/001* (2013.01); *G01V 1/16* (2013.01); *G01V 1/3843* (2013.01); *G01V 1/3852* (2013.01); *B63G 2008/004* (2013.01)

(58) Field of Classification Search
CPC .. B63G 8/001; B63G 8/00; B63G 8/22; B63C 11/42
USPC .............................. 114/312, 321; 367/15, 16
See application file for complete search history.

(56) References Cited

U.S. PATENT DOCUMENTS 1,571,833 A * 2/1926 De Feo .......................... 114/333
5,711,244 A 1/1998 Knapp
6,625,083 B2 9/2003 Vandenbroucke
7,290,496 B2 * 11/2007 Asfar et al. .................... 114/312
2007/0125289 A1 6/2007 Asfar et al.

FOREIGN PATENT DOCUMENTS

EP 0368472 A1 5/1990
EP 1217390 A1 6/2002

OTHER PUBLICATIONS

International Search Report dated Dec. 3, 2013, in related International Application No. PCT/EP2013/067347.
Written Opinion dated Dec. 3, 2013, in related International Application No. PCT/EP2013/067347.

* cited by examiner

*Primary Examiner* — Lars A Olson
(74) *Attorney, Agent, or Firm* — Patent Portfolio Builders PLLC

(57) ABSTRACT

An autonomous underwater vehicle (AUV) for recording seismic signals during a marine seismic survey. The AUV includes a body extending along an axis X and having a head portion, a middle portion, and a tail portion, wherein the middle portion is sandwiched between the head portion and the tail portion along the X axis; a cross-section of the middle portion, substantially perpendicular on the X axis, having a triangular-like shape; the head portion including a base portion having the triangular-like shape and configured to match the middle portion; the head portion having a tip that, when projected along the X axis on the base portion, substantially coincides with a centroid of the base portion having the triangular-like shape; and a seismic payload located within the body and configured to record seismic signals.

20 Claims, 9 Drawing Sheets

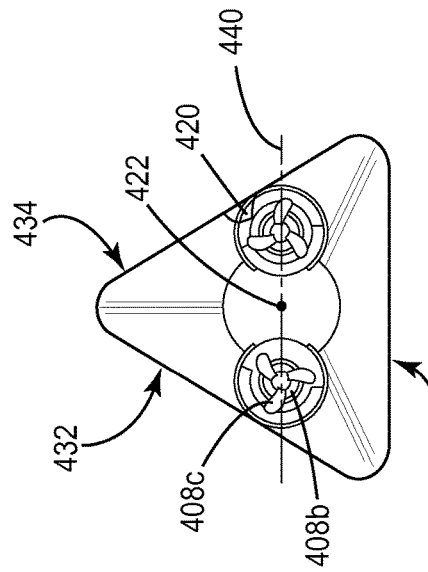
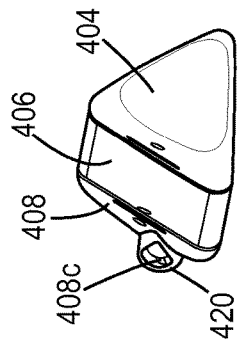
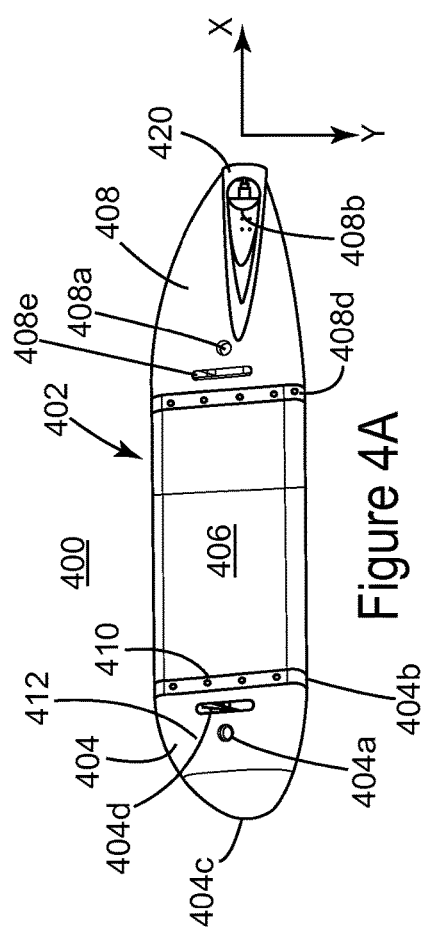

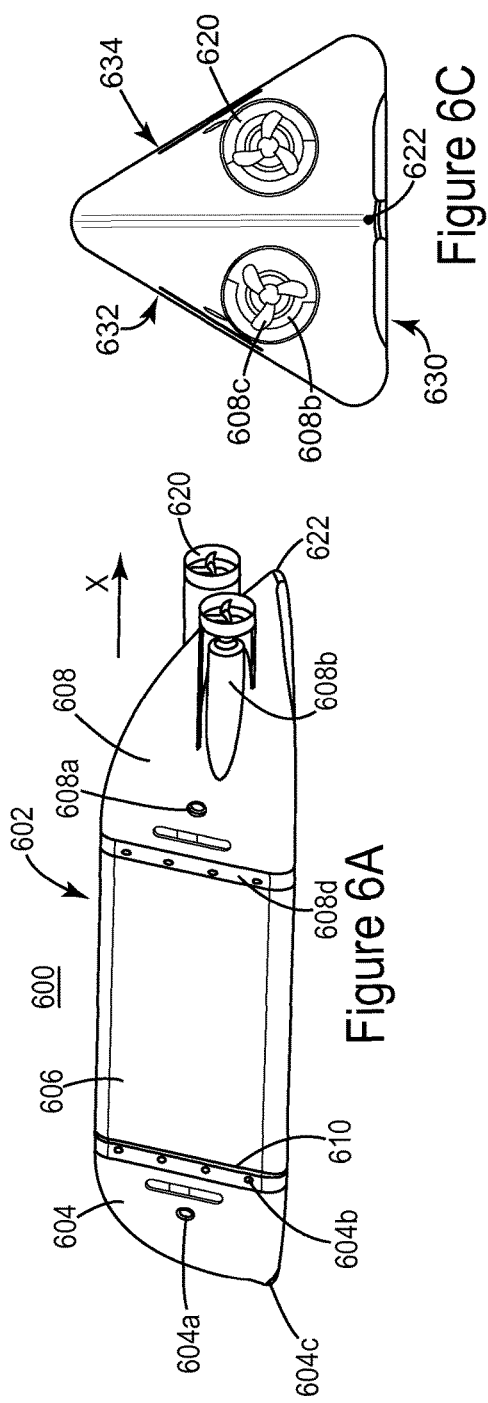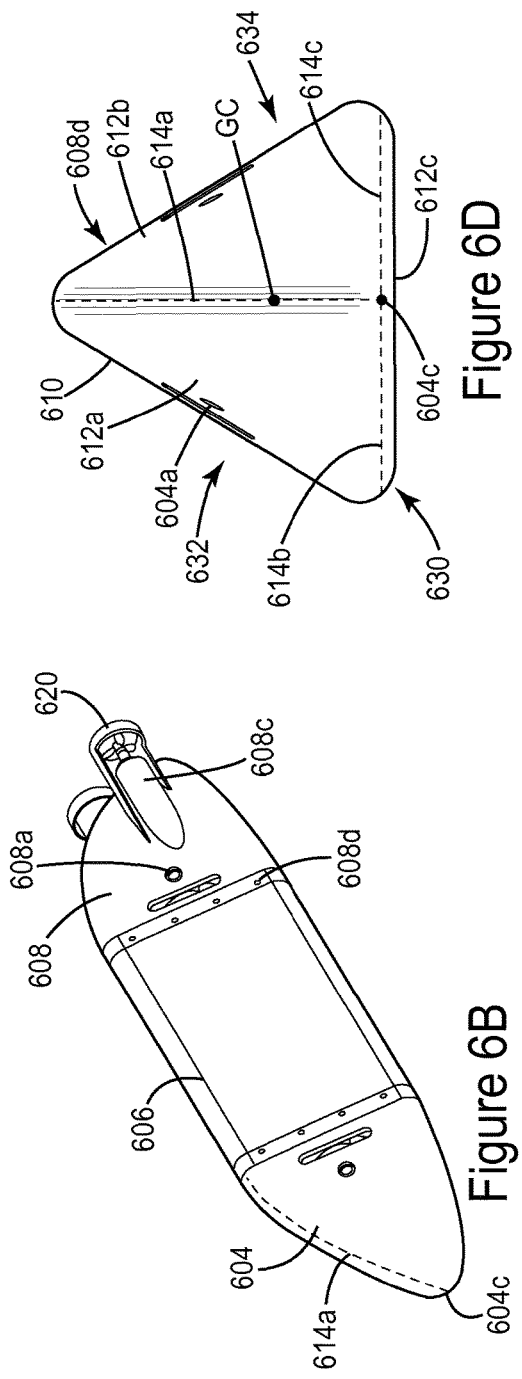

AUTONOMOUS UNDERWATER VEHICLE FOR MARINE SEISMIC SURVEYS

BACKGROUND

Technical Field

Embodiments of the subject matter disclosed herein generally relate to methods and systems and, more particularly, to mechanisms and techniques for performing a marine seismic survey using autonomous underwater vehicles (AUVs) that carry appropriate seismic sensors.

Discussion of the Background

Marine seismic data acquisition and processing generate a profile (image) of a geophysical structure under the seafloor. While this profile does not provide an accurate location of oil and gas reservoirs, it suggests, to those trained in the field, the presence or absence of these reservoirs. Thus, providing a high-resolution image of the geophysical structures under the seafloor is an ongoing process.

Reflection seismology is a method of geophysical exploration to determine the properties of earth's subsurface, which are especially helpful in the oil and gas industry. Marine reflection seismology is based on using a controlled source of energy that sends the energy into the earth. By measuring the time it takes for the reflections to come back to plural receivers, it is possible to evaluate the depth of features causing such reflections. These features may be associated with subterranean hydrocarbon deposits.

A traditional system for generating seismic waves and recording their reflections off the geological structures present in the subsurface is illustrated in FIG. 1. A vessel 10 tows an array of seismic receivers 11 provided on streamers 12. The streamers may be disposed horizontally, i.e., lying at a constant depth relative to the ocean surface 14. The streamers may have other than horizontal spatial arrangements. The vessel 10 also tows a seismic source array 16 configured to generate a seismic wave 18. The seismic wave 18 propagates downward and penetrates the seafloor 20 until eventually a reflecting structure 22 (reflector) reflects the seismic wave. The reflected seismic wave 24 propagates upward until it is detected by the receiver(s) 11 on the streamer(s) 12. Based on the data collected by the receiver(s) 11, an image of the subsurface is generated by further analyses of the collected data. The seismic source array 16 includes plural individual source elements, which may be distributed in various patterns, e.g., circular, linear, at various depths in the water.

However, this traditional configuration is expensive because the cost of streamers is high. New technologies deploy plural seismic sensors on the bottom of the ocean (ocean bottom stations) to improve the coupling. Even so, positioning seismic sensors remains a challenge.

Other technologies use permanent receivers set on the seafloor, as disclosed in U.S. Pat. No. 6,932,185, the entire content of which is incorporated herein by reference. In this case, the seismic sensors are attached to a heavy pedestal. A station holding the sensors is launched from a vessel and arrives, due to its gravity, at a desired position. The station remains on the seafloor permanently. Data recorded by sensors is transferred through a cable to a mobile station. When necessary, the mobile station may be brought to the surface to retrieve the data.

Although this method provides a better coupling between the seafloor and the sensors, the method is still expensive and not flexible because the station and corresponding sensors are left on the bottom of the ocean. Further, positioning the sensors is not straightforward.

An improvement to this method is described, for example, in European Patent No. EP 1 217 390, the entire content of which is incorporated herein by reference. In this document, a sensor is removably attached to a pedestal together with a memory device. After recording the seismic waves, the sensor and memory device are instructed by a vessel to detach from the pedestal and rise to the ocean surface for pick-up by the vessel.

However, this configuration is not very reliable because the mechanism maintaining the sensor connection to the pedestal may fail to release the sensor. Also, the sensor and pedestal may not reach their intended positions on the seabed. Further, leaving the pedestals behind increases ocean pollution and the survey price, which are both undesirable.

Accordingly, it would be desirable to provide systems and methods that provide an inexpensive and non-polluting device for reaching the bottom of the ocean, recording seismic waves and resurfacing for data collection.

SUMMARY

According to one exemplary embodiment, there is an autonomous underwater vehicle for recording seismic signals during a marine seismic survey. The AUV includes a body extending along an axis X and having a head portion, a middle portion, and a tail portion, wherein the middle portion is sandwiched between the head portion and the tail portion along the X axis; a cross-section of the middle portion, substantially perpendicular on the X axis, having a triangular-like shape; the head portion including a base portion having the triangular-like shape and configured to match the middle portion; the head portion having a tip that, when projected along the X axis on the base portion, substantially coincides with a centroid of the base portion having the triangular-like shape; and a seismic payload located within the body and configured to record seismic signals.

According to another exemplary embodiment, there is an autonomous underwater vehicle (AUV) for recording seismic signals during a marine seismic survey. The AUV includes a body extending along an axis X and having a head portion, a middle portion, and a tail portion, wherein the middle portion is sandwiched between the head portion and the tail portion along the X axis; a cross-section of the middle portion, substantially perpendicular on the X axis, having a triangular-like shape; the head portion including a base portion having the triangular-like shape and configured to match the middle portion; the head portion having a tip that, when projected along the X axis on the base portion to a projection point, the projection point lies on an altitude of the base portion having the triangular-like shape, between a centroid (GC) of the triangular-like shape and a corresponding side of the base portion; and a seismic payload located within the body and configured to record seismic signals.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 4A-D illustrate an external shape of an AUV according to an exemplary embodiment;

FIGS. 6A-E illustrate still another external shape of an AUV according to an exemplary embodiment;

DETAILED DESCRIPTION

Figure 1:
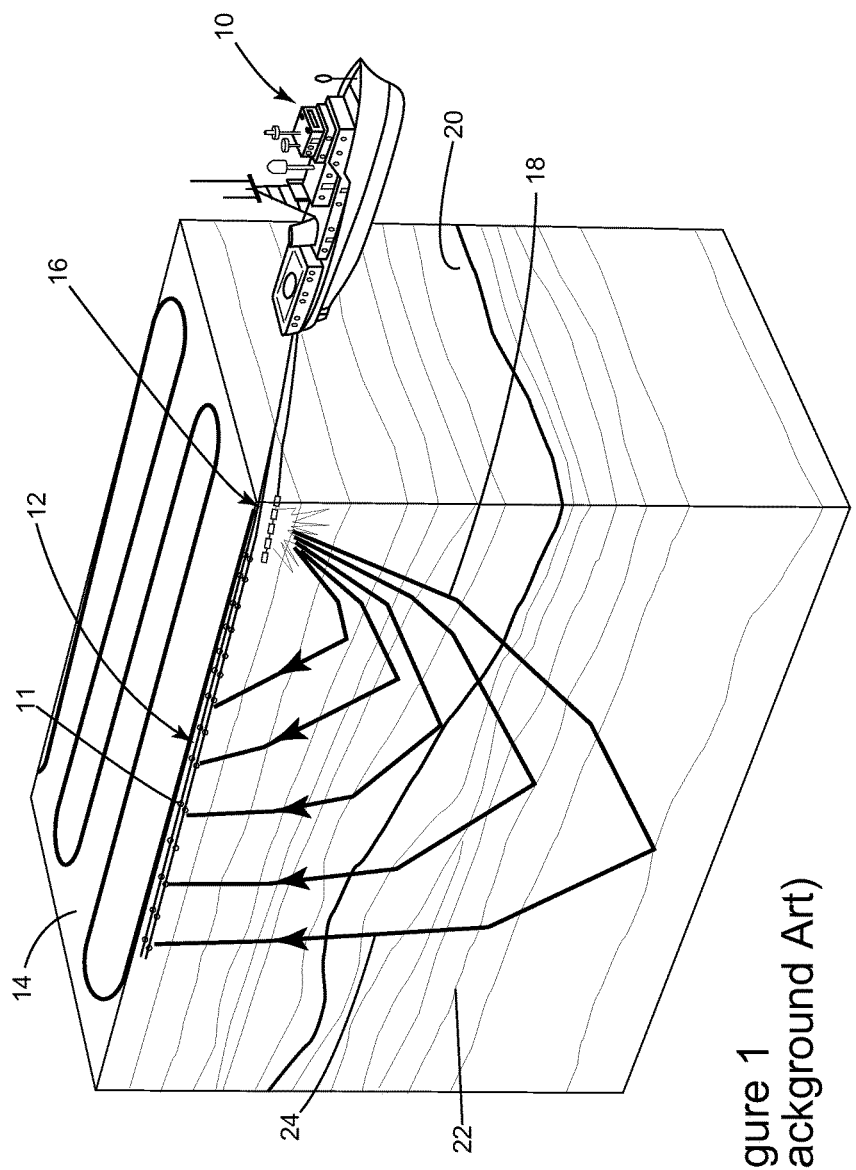
FIG. 1 is a schematic diagram of a conventional seismic survey system.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of an AUV having seismic sensors for recording seismic waves.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Emerging technologies in marine seismic surveys need an inexpensive system for deploying and recovering seismic receivers that are configured to operate underwater. This means that the new devices may be deployed underwater or on the ocean's bottom for collecting seismic data while mobile. According to an exemplary embodiment, such a seismic system includes plural AUVs, each having one or more seismic sensors. The seismic sensors may be each a hydrophone, geophone, accelerometers, electromagnetic sensors, etc.

The AUV may be inexpensively and efficiently designed, e.g., using internal components available off the shelf. A deployment vessel stores the AUVs and launches them as necessary for the seismic survey. The AUVs find their desired positions using, for example, an inertial navigation system. Other systems or methods may be used for finding their desired positions. Thus, the AUVs may be preprogrammed or partially programmed to find their desired positions. If the AUVs are partially programmed, the final details for finding the desired position may be received, acoustically, from the vessel when the AUV is launched from the vessel.

As the deployment vessel is launching the AUVs, a shooting vessel for generating seismic waves may follow the deployment vessel. The shooting vessel may tow one or more seismic source arrays. The shooting vessel or another vessel, e.g., the recovering vessel, may then instruct selected AUVs to resurface so they can be collected. In one embodiment, the deployment vessel also tows source arrays and shoots them as it deploys the AUVs. In still another exemplary embodiment, only the deployment vessel is configured to retrieve the AUVs. However, it is possible that only the shooting vessel is configured to retrieve the AUVs. Alternatively, a dedicated recovery vessel may wake up the AUVs and instruct them to return to the surface for recovery.

In one exemplary embodiment, the number of AUVs is in the thousands. Thus, the deployment vessel is configured to hold all of them at the beginning of the seismic survey and then to launch them as the survey advances. If the shooting vessel is configured to retrieve the AUVs, when the number of available AUVs at the deployment vessel goes below a predetermined threshold, the shooting vessel and deployment vessel are instructed to switch positions in mid-survey. If a dedicated recovery vessel is used to recover the AUVs, then the deployment vessel is configured to switch positions with the recovery vessel when the deployment vessel becomes empty. In another exemplary embodiment, both vessels are full of AUVs. The first one starts deploying the AUVs, and the second one just follows. Once the first one has deployed most or all of the AUVs, this vessel becomes the recovery vessel and the second one starts deploying AUVs, thus becoming the deployment vessel. Later, the two vessels may switch functions as necessary.

In an exemplary embodiment, the seismic survey is performed with a combination of seismic sensors of the AUVs and seismic sensors of streamers towed by the deployment vessel, or the shooting vessel, or by both of them.

In still another exemplary embodiment, when selected AUVs are instructed to surface, they may be programmed to go to a desired rendezvous point where they will be collected by the shooting vessel, the deployment vessel, or the recovery vessel. The selected AUVs may be chosen from a given row or column if that type of arrangement is used. The shooting or/and deployment or recovery vessel may be configured to send acoustic signals to the returning AUVs to guide them to the desired position. The AUVs may be configured to rise to a given water depth, travel the return path at that depth, and then surface for recovery. In one exemplary embodiment, the AUVs are configured to communicate among themselves so they follow each other along their path back to the recovery vessel, or they communicate among themselves to establish a queue for retrieval by the shooting, recovery or deployment vessel.

Once on the vessel, the AUVs are checked for problems, their batteries may be recharged or replaced, and the stored seismic data may be transferred to the vessel for processing. The recovery vessel may store the AUVs on deck during maintenance or somewhere inside the vessel, e.g., inside of a closed or open module that is fixed on the vessel or the vessel's deck. A conveyor-type mechanism may be designed to recover the AUVs on one side of the vessel, when the vessel is used as a recovery vessel, and to launch the AUVs from the other side of the vessel when it is used as a deployment vessel. After this maintenance phase, the AUVs are again deployed as the seismic survey continues. Thus, in one exemplary embodiment, the AUVs are continuously deployed and retrieved. In still another exemplary embodiment, the AUVs are configured to not transmit the seismic data to the deployment, shooting or recovery vessel while performing the seismic survey. This may be advantageous when the AUV has limited electric power. In another exemplary embodiment, each AUV has enough electric power (stored in the battery) to be deployed only once, to record seismic data, and to resurface for retrieval. Thus, reducing the volume of data transmission between the AUV and the vessel while the AUV is underwater conserves power and allows the AUV to be retrieved before running out of power.

Figure 2:
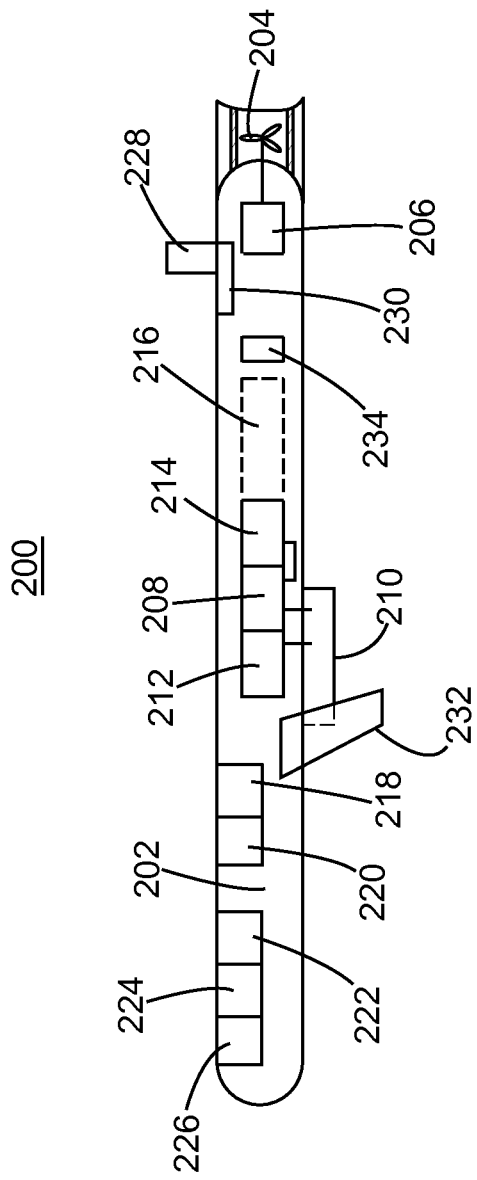
FIG. 2 is a schematic diagram of internal components of an AUV according to an exemplary embodiment.

The above-noted embodiments are now discussed in more detail with regard to the figures. FIG. 2 illustrates an AUV 200 having a body 202 to which one or more propellers 204 are attached. A motor 206 inside the body 202 activates the propeller 204. The motor 206 may be controlled by a processor 208. The processor 208 may also be connected to a seismic sensor 210. The seismic sensor 210 may be shaped so that when the AUV lands on the seabed, the seismic sensor achieves a good coupling with the seabed sediments. The seismic sensor may include one or more of a hydrophone, geophone, accelerometer, etc. For example, if a 4C (four component) survey is desired, the seismic sensor 210 includes three accelerometers and a hydrophone, i.e., a total of four sensors. Alternatively, the seismic sensor may include three geophones and a hydrophone. Of course other sensor combinations are possible.

A memory unit 212 may be connected to the processor 208 and/or the seismic sensor 210 for storing the seismic sensor's 210 recorded data. A battery 214 may be used to power all these components. The battery 214 may be allowed to change its position along a track 216 to alter the AUV's center of gravity.

The AUV may also include an inertial navigation system (INS) 218 configured to guide the AUV to a desired location. An inertial navigation system includes at least a module containing accelerometers, gyroscopes, magnetometers or other motion-sensing devices. The INS is initially provided with the position and velocity of the AUV from another source, for example, a human operator, a GPS satellite receiver, another INS from the vessel, etc., and thereafter, the INS computes its own updated position and velocity by integrating (and optionally filtrating) information received from its motion sensors. The advantage of an INS is that it requires no external references in order to determine its position, orientation or velocity once it has been initialized.

Besides or instead of the INS 218, the AUV 200 may include a compass 220 and other sensors 222 such as, for example, an altimeter for measuring its altitude, a pressure gauge, an interrogator module, etc. The AUV may optionally include an obstacle avoidance system 224 and a communication device 226 (e.g., Wi-Fi device, a device that uses an acoustic link) or other data transfer device capable of wirelessly transferring data. One or more of these elements may be linked to the processor 208. The AUV further includes an antenna 228 (which may be flush with the body of the AUV) and a corresponding acoustic system 230 for communicating with the deploying, shooting or recovery vessel. Stabilizing fins and/or wings 232 for guiding the AUV to the desired position may be used together with the propeller 204 for steering the AUV. However, as disclosed in later embodiments, such fins may be omitted. The AUV may include a buoyancy system 234 for controlling the AUV's depth and keeping the AUV steady after landing.

The acoustic system 230 may be an Ultra-short baseline (USBL) system, also sometimes known as a Super Short Base Line (SSBL). This system uses a method of underwater acoustic positioning. A complete USBL system includes a transceiver, which is mounted on a pole under a vessel, and a transponder/responder on the AUV. A processor is used to calculate a position from the ranges and bearings measured by the transceiver. For example, the transceiver transmits an acoustic pulse that is detected by the subsea transponder, which replies with its own acoustic pulse. This return pulse is detected by the transceiver on the vessel. The time from transmission of the initial acoustic pulse until the reply is detected is measured by the USBL system and is converted into a range. To calculate a subsea position, the USBL calculates both a range and an angle from the transceiver to the subsea AUV. Angles are measured by the transceiver, which contains an array of transducers. The transceiver head normally contains three or more transducers separated by a baseline of, e.g., 10 cm or less.

Figure 3:
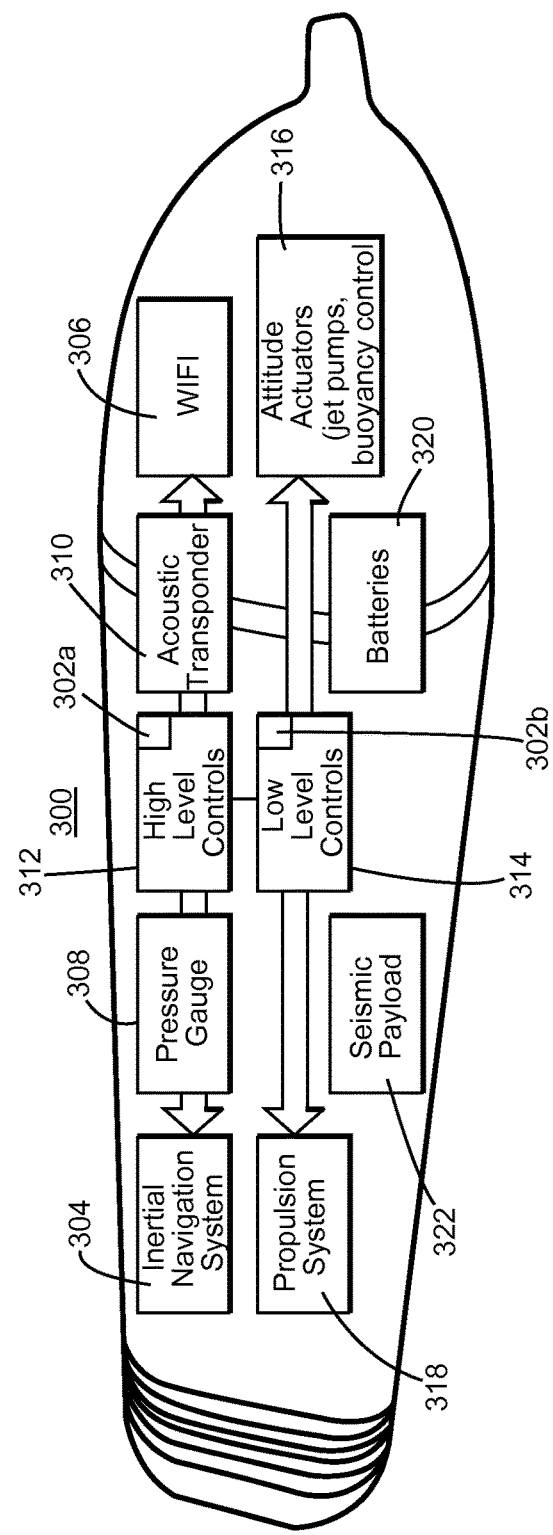
FIG. 3 is a schematic diagram of connections between internal components of an AUV according to an exemplary embodiment.

With regard to the AUV's internal configuration, FIG. 3 schematically shows a possible arrangement for the internal components of an AUV 300. The AUV 300 has a CPU 302a that is connected to INS 304 (or compass or altitude sensor and acoustic transmitter for receiving acoustic guidance from the mother vessel), wireless interface 306, pressure gauge 308, and transponder 310. The CPU 302a may be located in a high-level control block 312. The INS is advantageous when the AUV's trajectory has been changed, for example, because of an encounter with an unexpected object, e.g., fish, debris, etc., because the INS is capable of taking the AUV to the desired final position as it does for currents, wave motion, etc. Also, the INS may have high precision. For example, it is expected that for a target having a depth of 300 m, the INS and/or the acoustic guidance is capable of steering the AUV within +/−5 m of the desired target location. However, the INS may be configured to receive data from the vessel to increase its accuracy. An optional CPU 302b, in addition to the CPU 302a, is part of a low-level control module 314 configured to control attitude actuators 316 and the propulsion system 318. The high-level control block 312 may communicate via a link with the low-level control module 314 as shown in the figure. One or more batteries 320 may be located in the AUV 300. A seismic payload 322 is located inside the AUV for recording the seismic signals. Those skilled in the art would appreciate that more modules may be added to the AUV. For example, if a seismic sensor is outside the AUV's body, a skirt may be provided around or next to the sensor. A water pump may pump water from the skirt to create a suction effect so that a good coupling between the sensor and the seabed is achieved. However, there are embodiments where no coupling with the seabed is desired. For those embodiments, no skirt is used.

Various external shapes of the AUV's body are envisioned, as discussed next. These novel shapes achieve less friction and/or higher stability than the existing AUV. FIGS. 4A-D show a first such embodiment. The AUV 400 has a body 402 that extends along a longitudinal axis X. The body 402 may include three parts, a head 404, a middle 406, and a tail 408, as shown in FIGS. 4A and 4B. These may be actual parts that are manufactured separately and then connected to each other or to a skeleton (not shown) of the AUV. However, in one application, these parts are not physically distinct, but are used to easier describe the AUV's shape. Various holes 404a and 408a and slots 404d and 408e are shown on the body 402. The slots may be used as water intakes for one or more water pumps, while the holes may be used as water outputs for one or more water pumps. Each face of the head and tail portions may have corresponding holes. In another application, each face of the head and tail portions may have corresponding slots. These features are discussed later when internal components of the AUV are explained. One or more engines 408b and associated propellers 408c (shown in FIG. 4D) are provided on the tail part 408. In one embodiment, two engines and two propellers are on the body 402, and each engine may be controlled independent of the other engine. However, in another embodiment, the engines and propellers are inside the body. Thus, in one exemplary embodiment, no component extends outside the body.

The shapes of each of the head, middle and tail parts are now discussed. Although FIG. 4C shows the head 404, a cross-section of the middle part 406 looks like the contour line 410 of the base 404b of the head part 404. The contour line 410 has a triangular-like shape with rounded corners 410a. In other words, a triangular-like shape is a triangle whose vertices are replaced with curved corners 410a as shown in FIGS. 4C and 4D. In one embodiment, any transversal cross-section of the middle part 406 has the same shape, i.e., triangular-like shape. A transversal cross-section is defined as a cross-section substantially perpendicular to the longitudinal axis X.

However, the head part 404 has a changing transversal cross-section. The base 404b of the head part 404 has a triangular-like shape that matches the shape of the middle part 406. Then, a transversal cross-section of the head part 404 becomes smaller until the head 404 terminates into a tip 404c. The tip 404c is chosen so that its projection along the axis X on the base 404b coincides with the geometric center (or centroid) of the base. Thus, as seen in FIG. 4C, the side faces 412 (three in this embodiment) of the head part are symmetrically distributed around axis X. The side faces 412 of the head part 404 are substantially flat next to the base 404b and then become curved as they approach the tip 404c. The side faces 412 are bounded by edges 414. Edges 414 are not defined, as customary, by the intersection of two planes. In this embodiment, the edges 414 are curved lines as the side faces become curved not only about the X axis but also along another corresponding axis perpendicular to the X axis. In other words, the side faces 412 form a curved tetrahedron. In still another application, the side faces 412 form a modified Reuleaux tetrahedron, i.e., the modified Reuleaux tetrahedron is defined by the intersection of four spheres of radius s centered at the vertices of a regular tetrahedron with side length s and one of the faces is afterward removed. In one embodiment, the head part 404 is made of two different components, the base 404b and a cap 404d, which may be separately manufactured and attached to each other by known means, e.g., soldering, gluing, welding, screws, etc.

With regard to the tail part 408, it is similar to the head part but extends more along the X axis than the head. Also, the tail 408 has two propellers 408c that may be mounted outside the body 402. However, in another exemplary embodiment illustrated later in FIG. 7, the propellers and corresponding engines 408b are installed completely inside the body 402. A protective sleeve 420 may be provided around the propellers for shielding them from debris or other objects present underwater, and/or for storage and hydrodynamic purposes. The tail part 408 has its own tip 422, which may be provided such that its projection on a base 408d coincides with the geometric center of the base 408d. The sides and edges of the tail part 408 may be similar to those of the head part 404, as noted when comparing FIGS. 4C and 4D.

In one application, one side 430 of the body 402 is selected to be the lower base of the AUV 400 and the other two sides 432 and 434 are the upper sides. This may be achieved by distributing the internal components such that the AUV 400's center of mass is closer to the lower base 430 than to the upper sides 432 and 434. Thus, if the AUV 400 is deployed to the ocean's bottom, it will land on the lower base 430. In one exemplary embodiment, the tip 422 of the tail part and the engines 408b may be located on the same plane 440, parallel to the lower base 430. In another application, the plane 440 may also include the tip 404c of the head part 404.

Figure 5B:
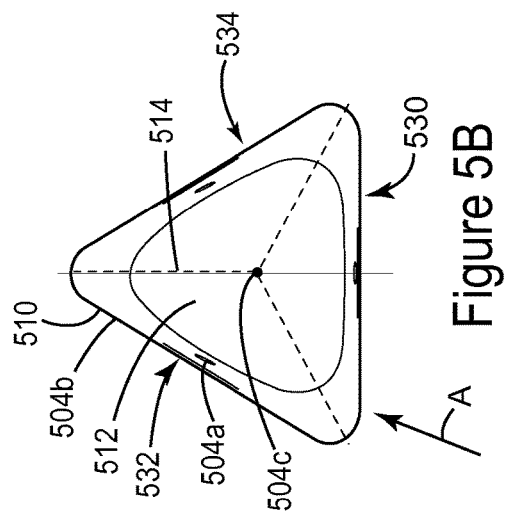
FIGS. 5A-C illustrate another external shape of an AUV according to an exemplary embodiment.
Figure 5A:
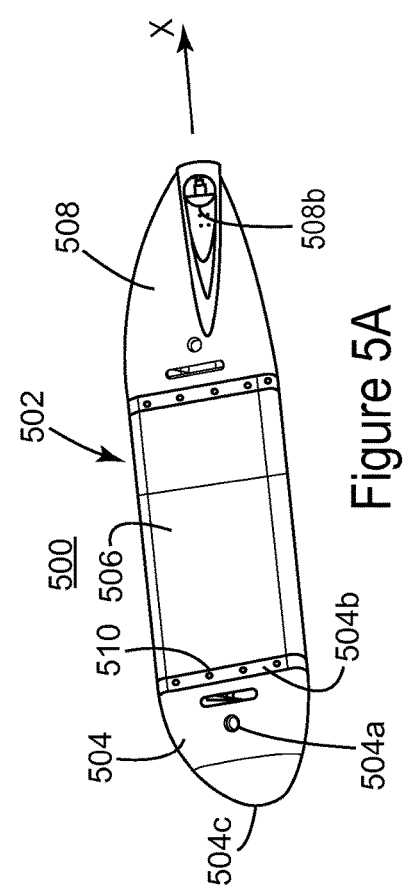
Figure 5C:
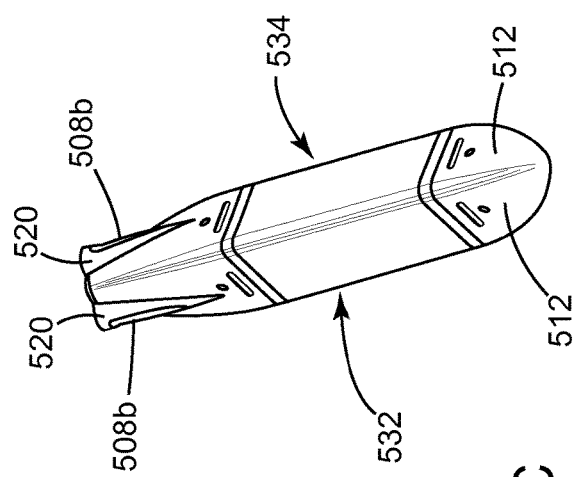

Another embodiment illustrating an external shape of an AUV 500 is shown in FIGS. 5A-C. FIG. 5A shows a body 502 having three parts, a head 504, a middle 506 and a tail 508. While the middle 506 and the tail 508 may be similar or identical to the middle and tail parts of the AUV 400 shown in FIGS. 4A-D, the head part 504 is different. As shown in FIG. 5B, the head part 504 has one or more holes 504a (in one embodiment, one hole for each face of the head and/or tail parts and/or one slot for each of the head and/or tail parts), a base 504b that connects to the middle part 506, and a tip 504c. The base 504b has a triangular-like shape with rounded corners. A line contour 510 illustrates this shape. The tip 504c, similar to the tip 404c of the head part of the embodiment shown in FIGS. 4A-D, may be located such that its projection along axis X on the base 504b coincides with the geometric center of the base 504b.

However, different from the side faces 412 of the embodiment illustrated in FIGS. 4A-D, the side faces 512 in this embodiment are flatter (planar), i.e., the side face 512 illustrated in FIG. 5B resembles a flat plane that is curved around direction A and only slightly around axis X. FIG. 5C is a top view of the AUV 500 showing the upper sides 532 and 534 (the lower base 530 is shown in FIG. 5B), the engine compartments 508b and corresponding sleeves 520. Note that the engine compartments and corresponding propellers are fully distributed within the body 502.

Figure 6E:
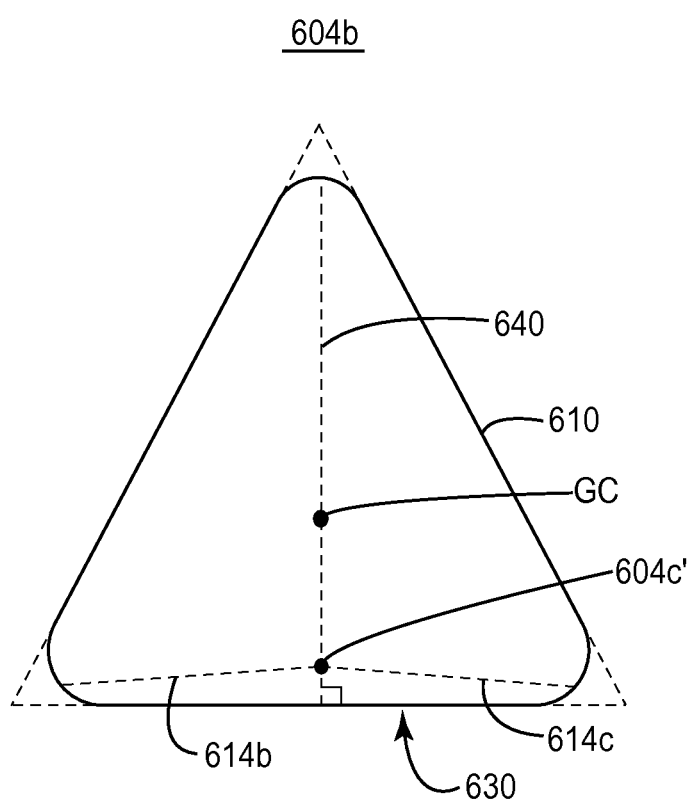

Still another embodiment showing an AUV's external shape is illustrated in FIGS. 6A-E. FIGS. 6A-B show the AUV 600 having the body 602 divided into a head part 604, a middle part 606, and a tail part 608. A transversal cross-section of the middle part 606, as defined by contour line 610, has a triangular-like shape. A base 604b of the head part 604 and a base 608d of the tail part 608 are coupled to the middle part 606, and thus, they also have a triangular-like cross-section.

The head part 604 has a tip 604c that is much closer to the lower base 630 than the upper sides 632 and 634, as illustrated in FIG. 6D. In other words, a projection point 604c' of the tip 604c, along the axis X, onto the base 604b, as shown in FIG. 6E, does not coincide with the geometric center GC of the base 604b. Instead, the projection point 604c' lies on an attitude 640 of the base 604b having the triangular-like shape. Thus, contrary to the previous embodiments, the projection point 604c' is far away from the geometric center GC and very close to the lower base 630 as illustrated in FIGS. 6D and 6E. In one application, the projection point 604c' is substantially within 0 to 20% of the length of the attitude 640 measured from the lower base 630.

Thus, the head part 604 has two side faces 612a and 612b that are symmetrical relative to an edge 614a and one side face 612c that is smaller than the side faces 612a and 612b. The side faces 612a and 612b are bent to connect along the edge 614a. In one application, the side face 612c may be almost entirely flat and slightly bent at edges 614b and 614c to connect side faces 612a and 612b. Thus, in this embodiment, the head portion 604 is symmetrical relative to the edge 614a but not relative to the edges 614b and 614c.

The tail part 608 is illustrated in FIG. 6C and is similar to the head part shown in FIG. 6D except that the tail is longer along the X axis than the head. In this embodiment, the tip 622 of the tail part 608 is also very close to the lower base 630, similar to the tip 604c in FIG. 6D, while the propellers 608c are similarly situated as in the previous embodiments. In this embodiment, the tip 622 of the tail part does not belong to the plane formed by the axes of the propellers 608c. FIG. 6A shows the location of the tip 622 relative to the elements of the AUV. A similar sleeve 620 as in the previous embodiments may be provided around the propellers. Also, the engines and propellers may be completely within the body 602.

The outside parts of the AUVs discussed with regard to FIGS. 4A to 6E may be made of metal, plastic, polymers, composites or a composition of these materials. Although the figures show the AUV body being made of three parts, more or fewer parts may be used to form the body. The AUVs shown in these embodiments are illustrative and not intended to limit the applicability of the present application. However, note that the shapes described in FIGS. 4A to 6D create less friction (drag), are stable when driven underwater compared to existing AUVs, offer easier storage, and/or helps the AUV to be stable on the sea bottom or keep a same position when floating. In addition, the shapes disclosed above allow the novel AUVs to not have fins or other wings traditionally used for stability or adjusting a travel direction. Adjusting the travel direction for the novel AUVs is discussed now with regard to FIG. 7.

Figure 7:
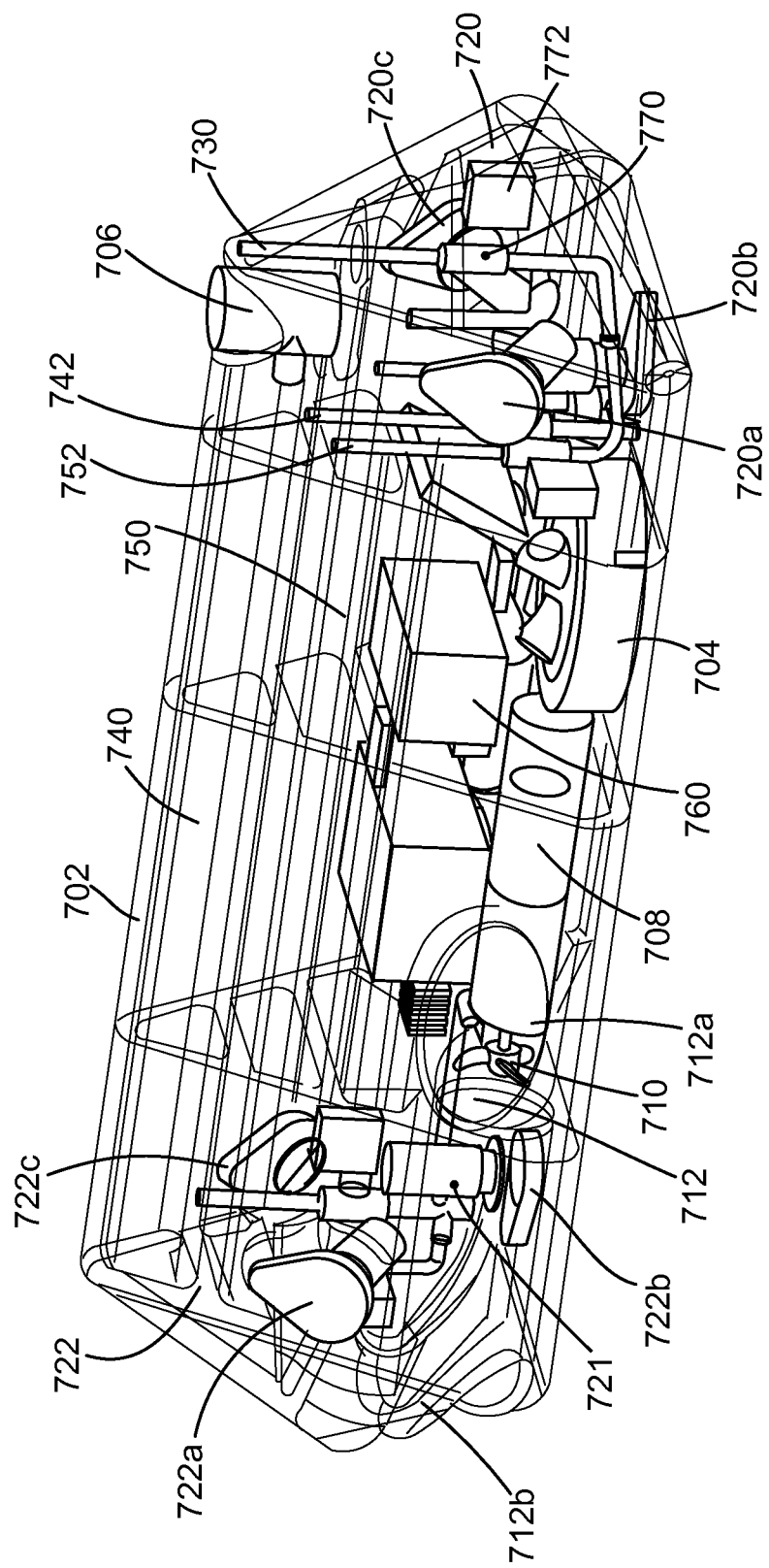
FIG. 7 is a schematic diagram of an internal structure of an AU according to an exemplary embodiment.

According to an exemplary embodiment illustrated in FIG. 7, the AUV may include one or more chambers (three in one embodiment) that may be used to control the AUV's buoyancy. In one exemplary embodiment, the AUV has no buoyancy chamber. For example, FIG. 7 shows an AUV 700 having a body 702 with a middle portion having a triangular-like shape as discussed above with regard to FIGS. 4A to 6D. The body 702 includes a payload 704 (e.g., seismic sensors) and an acoustic transceiver 706. In one embodiment, the acoustic transceiver may partially extend outside the body 702. The acoustic transceiver 706 is configured to communicate with the vessel and receive acoustic guidance while traveling toward a desired target point. Alternatively or additionally, an INS may be used for guidance. Many of the features discussed with regard to FIGS. 2 and 3 may be present in the body but, for simplicity, are neither shown nor discussed with regard to this figure.

FIG. 7 also shows a motor 708 configured to rotate a propeller 710 for providing thrust to the AUV 700. One or more motors and corresponding propellers may be used. The entire motor 708 and propeller 710 may be within the body 702. The propeller 710 may receive water through a channel 712 in the body 702. The channel 712 has two openings, an intake water element 712a and a propulsion nozzle 712b, that communicate with the ambient water. These two openings are not shown in the embodiments illustrated in FIGS. 4A to 6D for simplicity. The two openings may be located on the head, tail or middle portions of the body 702.

Guidance nozzles or turbines may be provided at the head portion 720 and/or at the tail portion 722 of the body 702. For simplicity, the guidance nozzles and the turbines are identified by the same reference numbers and are used interchangeably herein. However, if the AUV has guidance nozzles, no turbines are used and the other way around. Three guidance nozzles 720a-c may be located at the head portion 720 and three guidance nozzles 722a-c may be located at the tail portion 722 of the body 702. In one application, only the head portion nozzles are present. In still another application, only the tail portion nozzles are present. The nozzles are connected by piping to corresponding water pumps 721. If turbines are used instead of the nozzles, the element 721 is an engine that rotates a corresponding turbine. If nozzles are used, one or more water pumps may be used. These water pumps may take in water through various vents (e.g., slots 404d and/or 408e in FIG. 4A) and guide the water through one or more of the guidance nozzles (404a, 504a, 604a, 408a) at desired speeds. Alternatively, the water pumps may take in the water at one guidance nozzle and expel the water at the other nozzle or nozzles. Thus, according to this exemplary embodiment, the AUV has the capability to adjust the position of its nose with the guidance nozzles (or turbines) 720a-c and the position of its tail with the guidance nozzles (or turbines) 722a-c. However, in another embodiments, only the tail nozzles or only the nose nozzles may be implemented.

By driving water out of the body 702, according to this exemplary embodiment, the AUV has the ability to adjust the position of its head (with the guidance nozzles 720a-c) and the position of its tail (with the guidance nozzles 722a-c). However, in other embodiments, only the tail nozzles or only the head nozzles may be implemented and/or controlled. In still another exemplary embodiment, a translation of the AUV along the Y and Z axes may be controlled with the guidance nozzles. In yet another exemplary embodiment, a rotation of the AUV (yaw and pitch) may be controlled with the guidance nozzles.

FIG. 7 also shows one or more chambers 740 and 750 that communicate through piping 742 and 752 and vents 730 with the ambient water so the chambers may be flooded when desired. A control unit 760 may instruct the water pump to provide water into one or more of the chambers 740 and 750 (to partially or fully flood them) so that the AUV's buoyancy becomes neutral or negative. The same control unit 760 can instruct the water pump (or use another mechanism) to discharge water from the one or more chambers so that the AUV's buoyancy becomes positive. Alternatively, the control unit 760 instructs one or more actuators 770 to fluidly connect the vent 730 to the flooding chamber for making the AUV's buoyancy negative. For making the buoyancy positive, the control unit 760 may instruct an accumulator 772 to provide compressed gas (e.g., air, $CO_2$, etc.) to the flooding chambers to expel water, and then the actuator 770 seals closed the emptied flooding chambers.

Communication between the AUV and a vessel (deployment, shooting or recovery) may take place based on various technologies, i.e., acoustic waves, electromagnetic waves, etc. According to an exemplary embodiment, an acoustic underwater positioning and navigation (AUPN) system may be used. The AUPN system may be installed on any one of the participating vessels and may communicate with the AUV's acoustic system.

The AUPN system may exhibit high accuracy and long-range performance in both positioning and telemetry modes. These features are obtained due to the automatic beam forming transducers that focus the sensitivity toward its targets or transponders. This beam cannot only be pointed in any direction below the vessel, but also horizontally and even upward to the surface because the transducer is sphere-shaped.

Thus, the AUPN is a hydro-acoustic Super Short Base Line—SSBL or USBL tow tracking system, able to operate in shallow and deepwater areas to proven ranges in excess of 3000 meters. It is a multi-purpose system used for a wide range of applications, including towfish and towed platform tracking, high accuracy subsea positioning and telemetry and scientific research.

The AUPN is used to determine the AUV position. In one embodiment, the actual AUV's position is measured with the AUPN and is then provided to the AUV, while moving to its desired position, to correct its INS trajectory.

Figure 8:
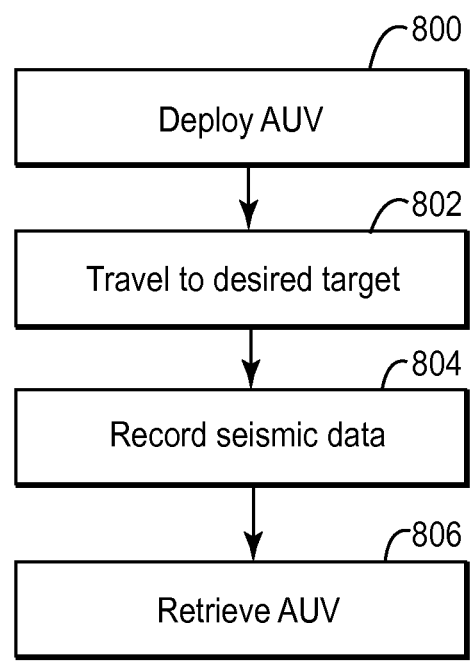
FIG. 8 is a flowchart illustrating a method for using an AUV according to an exemplary embodiment.

According to an exemplary embodiment illustrated in FIG. 8, there is a method for using an AUV described in FIGS. 4A to 7. The method includes a step 800 of deploying the AUV in water, for example, from a deployment vessel. The AUV can be any of the AUVs described in the previous exemplary embodiments. In step 802, the AUV travels to a desired target, either on the ocean floor or at a given depth, above the ocean floor. In step 804 the AUV records seismic data while on the ocean floor or while traveling to the desired target at the given depth. In step 806 the AUV is recovered by the deployment vessel or another vessel.

One or more of the exemplary embodiments discussed above disclose an AUV configured to perform seismic recordings. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. An autonomous underwater vehicle (AUV) for recording seismic signals during a marine seismic survey, the AUV comprising:
    a body extending along an axis X and having a head portion, a middle portion, and a tail portion, wherein the middle portion is sandwiched between the head portion and the tail portion along the X axis;
    a cross-section of the middle portion, substantially perpendicular on the X axis, having a triangular-like shape;
    the head portion including a base portion having the triangular-like shape and configured to match the middle portion;
    the head portion having a tip that, when projected along the X axis on the base portion, substantially coincides with a centroid of the base portion having the triangular-like shape; and
    a seismic payload located within the body and configured to record seismic signals.

2. The AUV of claim 1, wherein the triangular-like shape includes a triangle for which all vertices are replaced with curved lines.

3. The AUV of claim 1, wherein the tail portion has a base portion having the triangular-like shape and configured to match the middle portion.

4. The AUV of claim 3, wherein a tip of the tail portion, when projected along the X axis on the base portion of the tail portion, coincides with a centroid of the triangular-like shape or is below the centroid.

5. The AUV of claim 4, further comprising:
    two engines and two corresponding propellers located in a plane that includes the tip of the tail portion.

6. The AUV of claim 5, wherein the plane also includes the tip of the head portion.

7. The AUV of claim 1, wherein each of the head portion and the tail portion has holes and/or slots for water intake and water discharge.

8. The AUV of claim 1, further comprising:
    an intake water element located on the body and configured to take in water when deployed underwater;
    at least one propulsion nozzle located at a tail portion and configured to eject the water from the intake water element for propelling the AUV; and
    at least one propeller located in a channel connecting the intake water element to the at least one propulsion nozzle, the at least one propeller being configured to eject the water at the at least one propulsion nozzle.

9. The AUV of claim 1, wherein the head portion further comprises:
    three curved side faces, wherein the head portion has a tetrahedral shape with three faces of the tetrahedral shape being curved and corresponding to the three curved side faces.

10. The AUV of claim 9, wherein each of the three curved side faces is bent around two perpendicular axes.

11. The AUV of claim 9, wherein each of the three curved side faces is bent around only one axis.

12. The AUV of claim 9, wherein the three curved sides form a modified Releaux tetrahedron.

13. An autonomous underwater vehicle (AUV) for recording seismic signals during a marine seismic survey, the AUV comprising:
    a body extending along an axis X and having a head portion, a middle portion, and a tail portion, wherein the middle portion is sandwiched between the head portion and the tail portion along the X axis;
    a cross-section of the middle portion, substantially perpendicular on the X axis, having a triangular-like shape;
    the head portion including a base portion having the triangular-like shape and configured to match the middle portion;
    the head portion having a tip that, when projected along the X axis on the base portion to a projection point, the projection point lies on an altitude of the base portion having the triangular-like shape, between a centroid (GC) of the triangular-like shape and a corresponding side of the base portion; and
    a seismic payload located within the body and configured to record seismic signals.

14. The AUV of claim 13, wherein the triangular-like shape includes a triangle for which all vertices are replaced with curved lines.

15. The AUV of claim 13, wherein the tail portion has a base portion having the triangular-like shape and configured to match the middle portion.

16. The AUV of claim 13, further comprising:
    two engines and two corresponding propellers provided in a plane that does not include a tip of the tail portion.

17. The AUV of claim 16, wherein the plane also does not include the tip of the head portion.

18. The AUV of claim 13, wherein each of the head portion and the tail portion has holes and/slots for water intake and water discharge.

19. The AUV of claim 13, further comprising:
    an intake water element located on the body and configured to take in water when deployed underwater;
    at least one propulsion nozzle located at a tail portion and configured to eject the water from the intake water element for actuating the AUV;

at least one propeller located in a channel connecting the intake water element to the at least one propulsion nozzle, the at least one propeller being configured to eject the water at the at least one propulsion nozzle.

20. The AUV of claim 13, wherein the head portion has three faces, two of the faces being symmetrically distributed about a transversal plane that cuts in two the body and includes the axis X.

* * * * *